United States Patent [19]

Satzler

[11] Patent Number: 4,537,267
[45] Date of Patent: Aug. 27, 1985

[54] BELT TENSIONING MECHANISM

[75] Inventor: Ronald L. Satzler, Princeville, Ill.

[73] Assignee: Caterpillar Tractor Co., Peoria, Ill.

[21] Appl. No.: 563,719

[22] Filed: Dec. 20, 1983

[51] Int. Cl.³ .............................................. B62D 55/08
[52] U.S. Cl. ...................................... 180/9.1; 305/10;
                                                    305/29
[58] Field of Search ...................... 180/9.1; 305/10, 29,
                                                    305/30, 31, 32

[56] References Cited

U.S. PATENT DOCUMENTS

| | | | |
|---|---|---|---|
| 1,401,625 | 12/1921 | Mader | 180/9.22 |
| 2,452,671 | 11/1948 | Merrill | 305/10 |
| 2,998,998 | 9/1961 | Hyler et al. | 305/31 |
| 3,375,000 | 3/1968 | Seamands et al. | 267/162 |
| 3,889,769 | 6/1975 | Blomstrom et al. | 180/9.5 |
| 4,408,806 | 10/1983 | Orain | 308/6 R |

Primary Examiner—John A. Pekar
Attorney, Agent, or Firm—J. W. Burrows

[57] ABSTRACT

A belt tensioning mechanism is provided for use with a vehicle having an axle pivotably connected to a frame of the vehicle with inextensible belts entrained about wheel assemblies mounted on either side of the vehicle for transmitting tractive effort to the earth. Some systems provide tensioning of belts by producing a separating force between only the wheel assemblies on one side of the vehicle independent from the tensioning of the other side while others provide tensioning of track having sprocket driving members by using bulky complicated mechanisms for providing the tensioning of the track and to provide relative motion of the front axle from one side to the other. In the subject arrangement, an axle is connected to a frame by a swivel bearing being slidably disposed on a pin, such that, the axle moves longitudinally relative to the frame while still being able to swivel about the pin. Furthermore, an adjusting mechanism is provided to produce the force necessary to sufficiently tension the belts to provide frictional drive between the belts and the drive wheel assemblies. In one of the embodiments, the adjusting mechanism includes a force generating mechanism responsive to fluid pressure transmitted thereto from a pump. This arrangement allows the axle to move relative to the frame in the longitudinal direction in the event that a foreign object passes between one of the belts and its respective wheel assembly without requiring a large bulky mechanism that would be impractical for use on large industrial vehicles.

13 Claims, 3 Drawing Figures

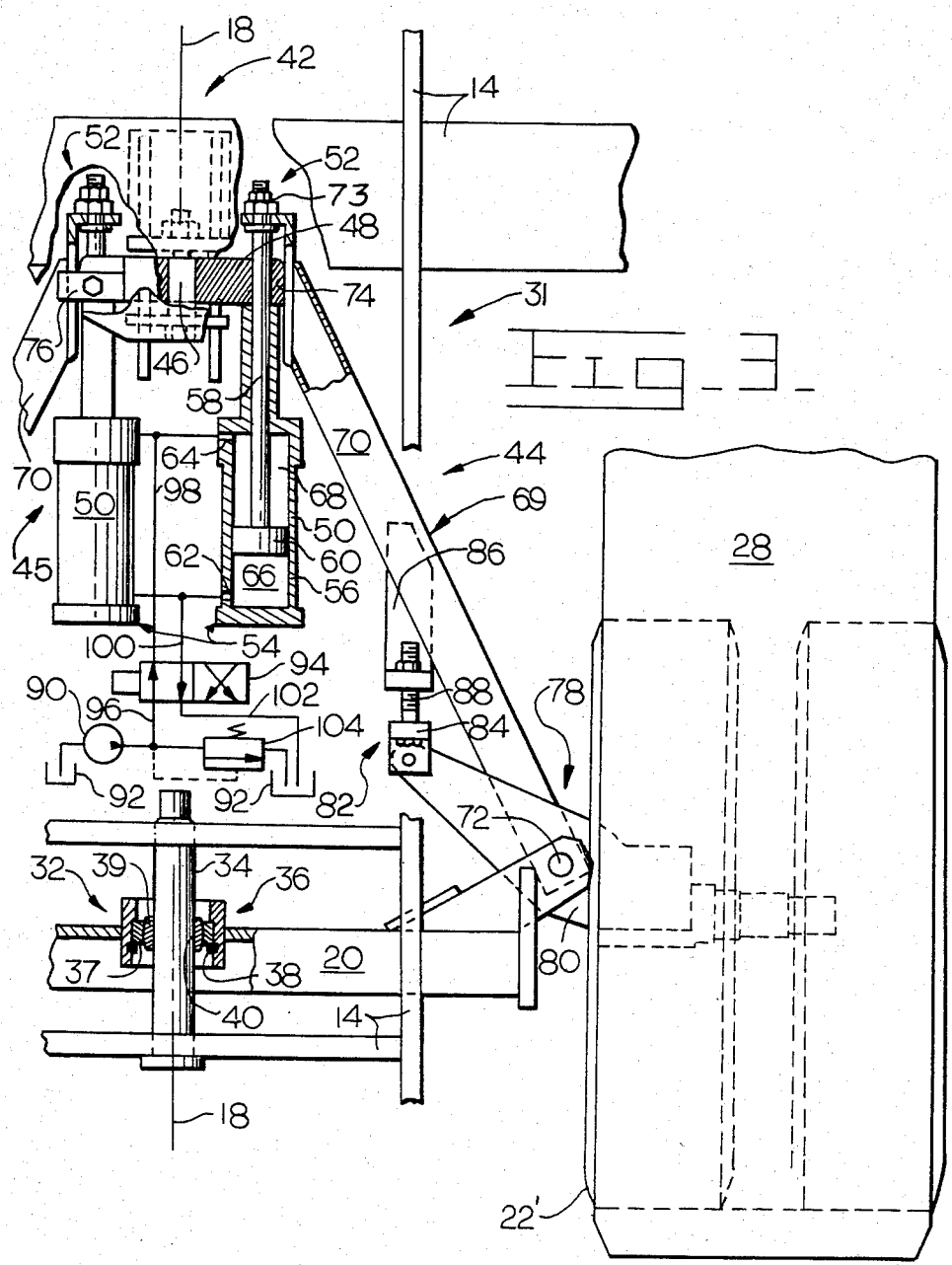

BELT TENSIONING MECHANISM

DESCRIPTION

1. Technical Field

This invention relates to crawler-type vehicles, tractors or equipment using track as opposed to wheels for providing both ground support and tractive effort, and more particularly, to vehicles having an axle extending across the vehicle with a belt tensioning mechanism provided for tensioning the belts.

2. Background Art

Work vehicles as opposed to vehicles for personnel transport are generally intended to push or pull other equipment or earth, or carry a load. Consequently, these vehicles require high tractive forces between the vehicle and the terrain that is being travelled. When using a belted track to increase tractive force, a high load must be generated in the belt in order to minimize slippage between the belted track and the drive wheels. Various types of tensioning mechanisms have been suggested for use on track-type vehicles and on belt-type vehicles to tension each track independently. However, these vehicles do not use a single axle extending across the vehicle.

Vehicles using a track tensioning mechanism in conjunction with a single axle extending across are illustrated in U.S. Pat. No. 1,401,625 issued Dec. 27, 1921 to J. Mader. The vehicle illustrated in this patent is a small garden tractor and includes a sprocket drive which does not rely on friction to provide belt drive, but utilizes a complex and bulky mechanism to provide tensioning of the track and further provide recoil when objects pass between the sprocket drive and the track. When attempting to utilize apparatus of this type in large industrial vehicles, the components would be unreasonably large and bulky thus prohibiting their practical use.

The present invention is directed to overcoming one or more of the problems as set forth above.

DISCLOSURE OF THE INVENTION

In one aspect of the present invention a belt tensioning mechanism is provided for use on a vehicle having a frame defining a plane aligned along its longitudinal axis. An axle is connected to the frame at one end of the vehicle and extends thereacross through the plane. A first pair of wheel assemblies are rotatably mounted on opposite ends of the axle and a second pair of wheel assemblies are driveably rotatably mounted on opposite sides of the frame at the other end of the vehicle. First and second inextensible belts are respectively entrained about the wheel assemblies on each side of the vehicle. A means is provided for connecting the axle to the frame so that the axle is free to swivel and to slide longitudinally relative to the frame and the centrally disposed plane. Also, a means is provided for adjusting the position of the axle relative to the frame to maintain at least a predetermined tension in the first and second belts while permitting the swiveling and longitudinal movements of the axle.

The present invention provides a tensioning mechanism which allows the axle to swivel about a locus relative to the frame and further allows the axle to move longitudinally relative to the frame for absorbing any motions created by one end of the axle moving in a longitudinal direction. Furthermore, the tensioning mechanism is compact while still having the ability to produce high forces for tensioning the belts. The entire mechanism utilized for tensioning and swiveling of the axle is relatively simple in construction and does not require large bulky components. This arrangement provides the high forces necessary for tensioning the belts while still allowing the axle to move relative to the frame whenever an object such as a rock, limb or board passes between the belt and the wheels.

BRIEF DESCRIPTION OF THE DRAWINGS

FIG. 3 is a plan view showing a portion of the vehicle encompassing an embodiment of the present invention taken generally along the line III—III in FIG. 2.

BEST MODE FOR CARRYING OUT THE INVENTION

Figure 1:
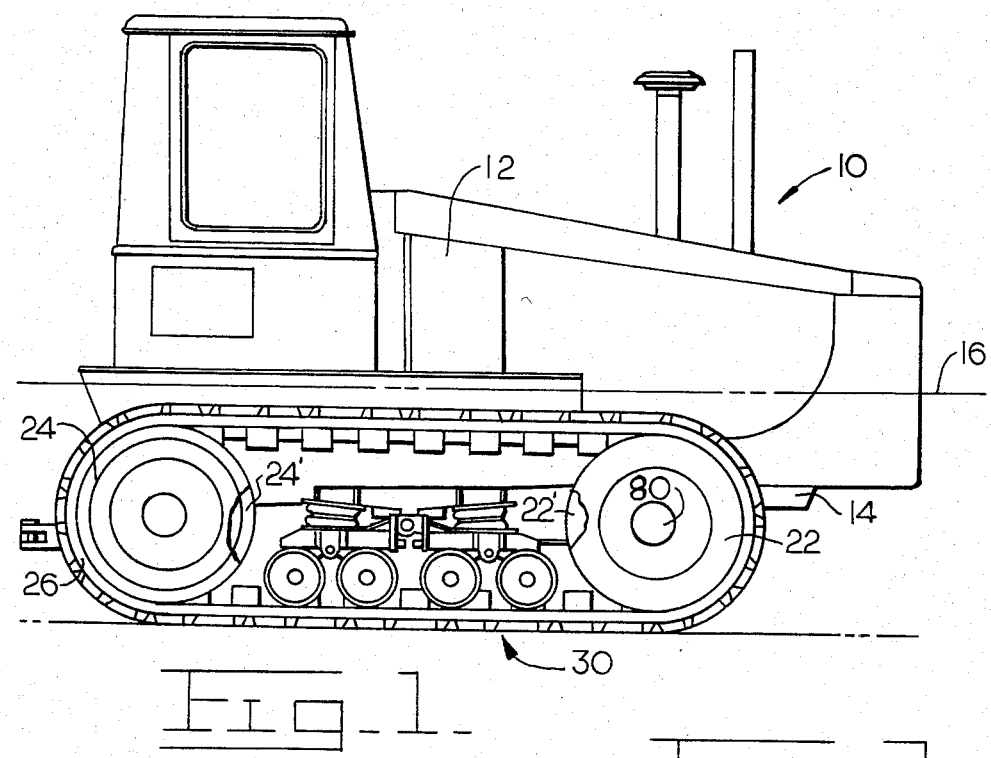
FIG. 1 is a side elevational view of a vehicle utilizing the embodiments of the present invention.
Figure 2:
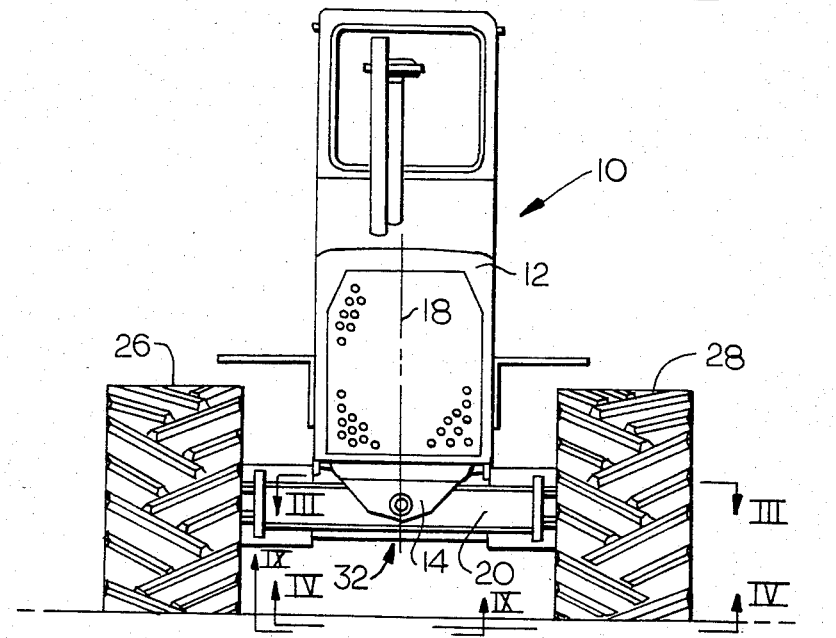
FIG. 2 is a front elevational view of the vehicle illustrated in FIG. 1.

Referring now to the drawings and more particularly to FIGS. 1 and 2, a work vehicle 10 is shown having a chassis 12 and a frame 14 which constitutes a portion of the chassis 12. The frame defines a longitudinal axis 16 and a plane 18 centrally disposed along the longitudinal axis 16.

The vehicle includes an axle 20 connected to a front portion of the frame 14 and has a first pair of wheel assemblies 22,22' rotatably connected to opposite ends of the axle 20. A second pair of wheel assemblies 24,24' are respectively connected to opposite sides of a rear portion of the frame 14. First and second inextensible belts 26,28 are respectively entrained about the wheel assemblies 22,24,22',24' on each side of the vehicle 10. A bogie system 30 is rotatably connected to the frame 14 on each side of the vehicle 10 and in load sharing contact with the respective belts 26,28 to share the loads being placed on the belts from the load of the vehicle as it negotiates the terrain.

Referring now to FIG. 3, a belt tensioning mechanism 31 is illustrated which more clearly shows an embodiment of the present invention. A means 32 is provided for connecting the axle 20 to the frame 14 so that the axle 20 is free to swivel and to slide longitudinally relative to the frame. The connecting means 32 includes a pin 34 connected to the frame 14 parallel to the longitudinal axis 16 and along the centrally disposed plane 18. The connecting means 32 also includes a swivel bearing 36 connected to the axle 20 and slidably disposed on the pin 34. The swivel bearing 36 includes a race 37 secured to the axle 20 by a snap ring 38 and a spherical bearing member 39 defining a bore 40 adapted to slidably mount on the pin 34.

A means 42 is provided for adjusting the axle 20 relative to the frame 14 to maintain at least a predetermined tension on the first and second belts 26,28, while permitting the swiveling and longitudinal movements of the axle 20. The adjusting means 42 includes a force generating mechanism 44 connected between the frame 14 and the axle 20.

The force generating mechanism 44 includes a jack mechanism 45 pivotably connected at one end to the frame 14 along the centrally disposed plane 18. The jack mechanism 45 includes a pivot pin 46, such as a bolt, dowell, etc., connected to the frame 14 along the centrally disposed plane 18 longitudinally remote from and in axial alignment with the pin 34. The jack mechanism 45 also includes a force transmitting member 48 pivotably mounted on the pivot pin 46 and a pair of jack assemblies 50.

Each of the jack assemblies 50 has a rod end portion 52 and a head end portion 54. Each of the jack assemblies 50 further includes a housing 56 and a rod 58 connected to a piston 60 which is slidably disposed in the housing 56. The head end portion 54 is generally defined by the housing 56 while the rod end portion 52 is generally defined by the rod 58. The housing 56 of each jack assembly 50 defines first and second ports 62,64 respectively in communication with head and rod end pressure chambers 66,68 which are separated by the piston 60. The housing 56 of each jack assembly is connected to opposite ends of the force transmitting member 48 while the rod 58 of each jack assembly 50 slidably extends through the force transmitting member 48 at the location of the connection with the housing 56.

The force generating mechanism 44 also includes a force transfer mechanism 69, such as, a pair of force transmitting arms 70 each respectively connected to opposite ends of the axle 20 by respective pin joints, one shown at 72. The other end of each of the force transmitting arms 70 is connected to the rod 58 of each of the jack assemblies 50 by locking nuts 73 in a known manner. The arms 70 each respectively has a surface 74 in sliding contact with the opposite ends of the force transmitting member 48. A plurality of retainers 76 are secured to the member 48 and adapted to maintain the sliding and alignment relationship between the surface 74 of the arms 70 and the opposite ends of the member 48.

Additionally, the force generating mechanism 44 includes a means 78 for aligning each of the first pair of wheel assemblies 22,22' relative to the belts 26,28. The alignment means 78 includes a pair of spindles 80 each pivotally connected to the opposite ends of the axle 20 at the respective pin joint 72 and a pair of adjusting assemblies 82 each being connected between the respective spindle 80 and the associated one of the force transmitting arms 70. The adjusting assembly 82 includes a first bracket 84 secured to the other end of the spindle 80 and a second bracket 86 secured to the arm 70 with an adjustable fastener member 88 connected between the brackets 84,86. As shown, the fastener member 88 is a bolt and nut, but it is recognized that the fastener member 88 could be replaced with other known adjustable fastening means. Each of the spindles 80 has the respective wheel assembly 22/22' rotatably connected to one end thereof.

The force generating mechanism 44 additionally includes a source of pressurized fluid, such as a pump 90, which draws fluid from a tank 92 in a conventional manner and delivers presssurized fluid to a switching valve 94 through a conduit 96. A pair of conduits 98,100 respectively connect the switching valve 94 to the inlet ports 64,62 of the jack assemblies 50. The switching valve 94 is connected to the tank 92 in a conventional manner by a conduit 102 and may be actuated either manually, electrically or hydraulically. A relief valve 104 is connected to the conduit 96 and adapted to control the pressure in the conduit 96 to a predetermined maximum level.

From a review of the Figs. and the above description, it is readily apparent that numerous modifications and/or combination of elements could be combined without departing from the essence of the invention. For example, various forms of hydraulic circuits could be utilized to extend and/or retract the cylinder disclosed herein without departing from the essence of the invention.

INDUSTRIAL APPLICABILITY

In the use of work vehicles of this type, the belt tensioning mechanism 31 as shown in the various embodiments herein is necessary to provide the high tensions in the belt to prevent slippage between the drive wheels 24,24' and the first and second belts 26,28. The tensioning mechanism 31 must generate sufficient tension in each of the belts 26,28 so that there is a satisfactory frictional driving force between the drive wheels 24,24' and the respective belt 26/28. For example, in one vehicle having a gross weight of 115.7 kN (26,000 lbs.) and a belt width of 61 cm (25 inches), an initial tension of 44.5 kN (10,000 lbs.) in each of the belts operated successfully. It is recognized that different size belts would vary in total force needed in the belt to maintain the frictional driving force between the belts 26,28 and the respective wheel assemblies. Furthermore, it is necessary to provide recoil of one side of the axle 20 in the event an object such as a rock, limb, board, etc. passes between one of the belts 26/28 and the respective wheel assembly 22/24,22'/24'.

Referring more specifically to the operation of the embodiment shown in FIG. 3, fluid pressure from the pump 90 is directed to the pressure chambers 68 of the jack assemblies 50 generating a force on the piston 60 which is transferred through the rod 58 and the arms 70 to the axle 20. The bore 40 of the spherical bearing member 39 allows the axle 20 to slide relative to the pin 34. Consequently, the force transmitted to the axle 20 is further transferred through the spindles 80 to the pair of wheel assemblies 22,22' and tensions the first and second belts 26,28. The relief valve 104 controls the maximum pressure in the pressure chambers 68 and consequently controls the tension in the belts 26,28.

When a foreign object passes between, for example, the belt 28 and the wheel assembly 22', the spindle 80 that is connected to the wheel assembly 22' moves towards the second wheel assembly 24'. It is recognized that if pneumatic tires are being used in the wheel assembly 22' that the tires will take a portion of the recoil and in many cases will be sufficient to absorb all of the recoil needed. In the event that the spindle 80 which is connected to the axle 20 moves towards the second wheel assembly 24', the axle 20 pivots about the other wheel assembly 22 and slides relative to the pin 34 without inducing any bending moments in the axle 20. Simultaneously therewith the arm 70 slides along the surface 74 relative to one end of the force transmitting member 48 causing extension of the rod 58 relative to the housing 56 against the bias of the pressure in the pressure chamber 68. The fluid displaced in the pressure chamber 68 as a result of the movement of the rod 58 is forced out the port 64 to the tank 92 through the conduit 98, the switching valve 94 and the relief valve 104. Since the setting of the pressure relief valve 104 has not changed, the force on the axle 20 through the arm 70 does not change with the above-noted movement. As the foreign object moves out from between the belt and wheel assembly, the axle 20 returns to its original position by fluid under pressure entering the pressure chamber 68 causing movement of the piston 68, rod 58, arm 70, and axle 20.

The swivel bearing 36 further allows the axle 20 to pivot about the pin 34 in the event one of the wheel assemblies 22,22' runs over a raised object on the ground. The force transmitting member 48 pivots about the pivot pin 46 thus allowing the jack assemblies 50 and arms 70 to pivot simultaneously with any pivoting movement of the axle 20 about the pin 34.

In the event that tensioning of the belts 26,28 cause relative misalignment of the rotating axis of the wheel assemblies 22,22', the adjusting assemblies 82 are adjusted in order to move the wheel assembly 22/22' about the pivot point 72 to realign the respective wheel assembly 22/22'.

If it is desirable to change one or both of the belts 26,28, the switching valve 94 is moved to its other position thus directing pressurized fluid to the pressure chambers 66 of the jack assemblies 50. The pistons 60 and associated rods 58 resulting in the axle 20 moving along the pin 34 towards the second pair of wheel assemblies 24,24'. After the new belt(s) have been installed, the switching valve 94 is returned to the original position thus directing the pressurized fluid into the pressure chambers 68 of the jack assemblies 50 to tension the belts as previously described.

In view of the foregoing, it is readily apparent that the belt tensioning mechanism 31 shown and described in the various embodiments provides a simple mechanism having the ability to provide high tensioning forces in the belts 26,28 while still allowing the axle 20 of the vehicle 10 to swivel and slide in a longitudinal direction relative to the frame 14 of the vehicle 10 to compensate for recoil action of one of the wheel assemblies 22,22' relative to the other.

Other aspects, objects and advantages of this invention can be obtained from a study of the drawings, the disclosure and the appended claims.

I claim:

1. A belt tensioning mechanism for use on a vehicle having a frame defining a plane aligned along its longitudinal axis, an axle connected to the frame at one end of the vehicle and extending thereacross through said plane, a first pair of wheel assemblies rotatably mounted on opposite ends of the axle independent of said frame, a second pair of wheel assemblies drivably mounted on opposite sides of the frame at the other end of the vehicle, and first and second inextensible belts respectively enstrained about the wheel assemblies on each side of the vehicle, comprising:

means for universally swiveling said axle relative to said frame and said centrally disposed plane and for sliding said axle longitudinally relative to said frame and said centrally disposed plane; and means for adjusting the position of said axle relative to said frame to maintain at least a predetermined tension in said first and second belts while permitting said universal swiveling and longitudinal movements of said axle.

2. The mechanism, as set forth in claim 1, wherein the connecting means includes a pin and a universally swiveling bearing slidably mounted on the pin, one of said pin and swivel bearing being secured to said axle at a point midway between the ends of the axle and the other of said pin and swivel bearing being secured to said frame at the one end of the vehicle along said centrally disposed plane.

3. The mechanism, as set forth in claim 2, wherein the adjusting means includes a force generating mechanism connected between the frame and the axle and being adapted to move the axle relative to the frame to establish the predetermined tension in the first and second belts.

4. The mechanism, as set forth in claim 3, wherein the force generating mechanism includes a jack mechanism pivotably and operatively connected at one end to said frame along said centrally disposed plane and a force transfer mechanism connected to opposite ends of the axle and operatively connected to the other end of said jack mechanism.

5. The mechanism, as set forth in claim 4, wherein the jack mechanism includes a pivot pin connected to the frame along the centrally disposed plane longitudinally remote from and in axial alignment with said pin, a force transmitting member pivotably mounted on said pivot pin, and a pair of jack assemblies each respectively connected between opposite ends of the force transmitting member and the force transfer mechanism.

6. The mechanism, as set forth in claim 5, wherein the force transfer mechanism includes a pair of force transmitting arms each connected between one of the jack assemblies and one of the ends of the axle.

7. The mechanism, as set forth in claim 6, wherein each of the jack assemblies includes a rod end portion and a head end portion with one of the end portions of the jack assemblies being connected to the opposite ends of the force transmitting member and the other of the end portions of the jack assemblies being connected to the respective force transmitting arms.

8. The mechanism, as set forth in claim 7, wherein each of said jack assemblies is adapted to generate at least a predetermined force on the axle for tensioning said first and second inextensible belts and is independently movable in response to one end of the axle moving longitudinally relative to said frame while maintaining at least said predetermined tension on said first and second belts.

9. The mechanism, as set forth in claim 8, wherein the force generating mechanism includes means for aligning each of said first pair of wheel assemblies relative to said belt so that said wheel assemblies are maintained in alignment with said belt.

10. The mechanism, as set forth in claim 9, wherein each of said force transmitting arms is pivotably connected to the axle by a pin joint and said aligning means includes a pair of spindles respectively pivotably connected to each end of the axle and having the respective wheel assemblies rotatably mounted on one end of each spindle, and a pair of adjusting assemblies respectively connected between each spindle and the respective force transmitting arms.

11. The mechanism, as set forth in claim 10, wherein each of said spindles is connected to the axle at the respective pin joint and each of said adjusting assemblies are connected to the other end of the spindles.

12. The mechanism, as set forth in claim 10, wherein said pair of jack assemblies are operative to selectively retract said axle and said first pair of wheel assemblies relative to said second pair of wheel assemblies so that said first and second belts may be changed.

13. The mechanism, as set forth in claim 12, wherein said pin is attached to the frame and said swivel bearing is attached to said axle.

* * * * *

UNITED STATES PATENT AND TRADEMARK OFFICE
CERTIFICATE OF CORRECTION

PATENT NO. : 4,537,267

DATED : August 27, 1985

INVENTOR(S) : Ronald L. Satzler

It is certified that error appears in the above-identified patent and that said Letters Patent are hereby corrected as shown below:

Column 5, line 41: after "drivably" insert --rotatably--.

Column 5, line 44: delete "enstrained" and insert --entrained--.

Signed and Sealed this

Fifteenth Day of April 1986

[SEAL]

Attest:

DONALD J. QUIGG

Attesting Officer

Commissioner of Patents and Trademarks